United States Patent
Mo et al.

(10) Patent No.: US 12,429,353 B2
(45) Date of Patent: Sep. 30, 2025

(54) METHOD AND APPARATUS FOR CONSTRUCTING LANE-LEVEL NAVIGATION MAP, DEVICE AND STORAGE MEDIUM

(71) Applicant: Beijing Baidu Netcom Science Technology Co., Ltd., Beijing (CN)

(72) Inventors: Gaopeng Mo, Beijing (CN); Lingling Liu, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 283 days.

(21) Appl. No.: 17/954,193

(22) Filed: Sep. 27, 2022

(65) Prior Publication Data
US 2023/0019719 A1    Jan. 19, 2023

Related U.S. Application Data

(63) Continuation of application No. PCT/CN2021/142311, filed on Dec. 29, 2021.

(30) Foreign Application Priority Data

Jun. 29, 2021  (CN) .......................... 202110729722.0

(51) Int. Cl.
G01C 21/00         (2006.01)
G01C 21/36         (2006.01)

(52) U.S. Cl.
CPC ..... G01C 21/3815 (2020.08); *G01C 21/3658* (2013.01)

(58) Field of Classification Search
CPC ............ G01C 21/3658; G01C 21/3815; G01C 21/3819; G01C 21/30; G01C 21/34
See application file for complete search history.

(56) References Cited

U.S. PATENT DOCUMENTS

2014/0032100 A1*  1/2014  Park .................... G06V 20/588
                                                                 701/446
2015/0316386 A1*  11/2015  Delp .................... B60W 60/001
                                                                 701/532

(Continued)

FOREIGN PATENT DOCUMENTS

CN    108151751 A    6/2018
CN    111238497 A    6/2020

(Continued)

OTHER PUBLICATIONS

Wang et al, "Map-Enhanced Ego-Lane Detection in the Missing Feature Scenarios", published: Jun. 2020, publisher: IEEE Access (Year: 2020).*

(Continued)

*Primary Examiner* — Wilson W Tsui
(74) *Attorney, Agent, or Firm* — Knobbe, Martens, Olson & Bear, LLP

(57) ABSTRACT

A method for constructing a lane-level navigation map is provided. The method may include: determining a change position of a lane in a road-level electronic map; extracting lane information of the change position of the lane, the lane information including a lane connectivity relationship; and storing the lane information in the road-level electronic map to obtain the lane-level navigation map.

15 Claims, 10 Drawing Sheets

(56) References Cited

U.S. PATENT DOCUMENTS

| | | | | |
|---|---|---|---|---|
| 2018/0365994 | A1* | 12/2018 | Song | G01C 21/3815 |
| 2019/0347493 | A1 | 11/2019 | Chen et al. | |
| 2020/0003572 | A1* | 1/2020 | Masuda | G09B 29/10 |
| 2020/0086890 | A1* | 3/2020 | Ikeda | G09G 5/37 |
| 2020/0132476 | A1* | 4/2020 | Roeth | G01C 21/3819 |
| 2020/0210717 | A1* | 7/2020 | Hou | G06V 20/588 |
| 2020/0364469 | A1 | 11/2020 | Fowe | |
| 2021/0001877 | A1 | 1/2021 | Han et al. | |
| 2022/0082403 | A1* | 3/2022 | Shapira | G01C 21/3822 |

FOREIGN PATENT DOCUMENTS

| | | |
|---|---|---|
| CN | 111488421 A | 8/2020 |
| CN | 111595358 A | 8/2020 |
| CN | 111696170 A | 9/2020 |
| CN | 111797722 A | 10/2020 |
| CN | 112131335 A | 12/2020 |
| CN | 113390407 A | 9/2021 |
| JP | 2019-184761 A | 10/2019 |
| JP | 2020-140602 A | 9/2020 |
| JP | 2020-204615 A | 12/2020 |
| JP | 2021-004885 A | 1/2021 |
| WO | 2017091953 A1 | 6/2017 |
| WO | WO 2020/070766 A1 | 4/2020 |

OTHER PUBLICATIONS

Jiang et al, "A Flexible Multi-Layer Map Model Designed for Lane-Level Route Planning in Autonomous Vehicles", publisher: Elsevier, published: Mar. 2019, pp. 305-318 (Year: 2019).*

International Search Report for PCT Application No. PCT/CN2021/142311, dated Mar. 31, 2022, in 5 pages.

Office Action in Chinese Application No. 202110729722.0, dated Mar. 30, 2022, in 9 pages.

* cited by examiner

METHOD AND APPARATUS FOR CONSTRUCTING LANE-LEVEL NAVIGATION MAP, DEVICE AND STORAGE MEDIUM

CROSS-REFERENCE TO RELATED APPLICATIONS

The present application is a continuation of International Application No. PCT/CN2021/142311, filed on Dec. 29, 2021, which claims the priority of Chinese Patent Application No. 202110729722.0, titled "Method and Apparatus for Constructing Lane-level Navigation Map, Device and Storage Medium," filed on Jun. 29, 2021, the disclosure of which is incorporated herein by reference in its entirety.

TECHNICAL FIELD

The present disclosure relates to the technical field of artificial intelligence, in particular to the technical field of intelligent transportation, and more particularly, to a method for constructing a lane-level navigation map, a method for lane-level navigation, apparatuses, a device, and a storage medium.

BACKGROUND

The design of urban roads is becoming more and more complex, and people are increasingly relying on mobile phone navigation for traveling. However, mobile phone navigation maps are road-level electronic maps and cannot provide lane-level navigation information.

SUMMARY

Embodiments of the present disclosure provide a method for constructing a lane-level navigation map, a method for lane-level navigation, apparatuses, a device, and a storage medium.

According to a first aspect, some embodiments of the present disclosure provide a method for constructing a lane-level navigation map, the method may include: determining a change position of a lane in a road-level electronic map; extracting lane information of the change position of the lane, the lane information including a lane connectivity relationship; and storing the lane information in the road-level electronic map to obtain the lane-level navigation map.

According to another aspect of the present disclosure, some embodiments of the present disclosure provide a method for lane-level navigation, the method may include: generating a road-level navigation route based on a lane-level navigation map; determining a change position of a lane on the road-level navigation route; reading lane information at the change position of the lane; and obtaining a lane-level navigation route based on the road-level navigation route and the lane information at the change position of a lane.

According to yet another aspect, some embodiments of the present disclosure provide an apparatus for constructing a lane-level navigation map, the apparatus may include: a determination module, configured to determine a change position of a lane in a road-level electronic map; an extraction module, configured to extract lane information at the change position of the lane, the lane information including a lane connectivity relationship; and a navigation module, configured to store the lane information in the road-level electronic map to obtain the lane-level navigation map.

According to yet another aspect, some embodiments of the present disclosure provide an apparatus for lane-level navigation, the apparatus may include: a route generation module, configured to generate a road-level navigation route based on a lane-level navigation map; a position determining module, configured to determine a change position of a lane on the road-level navigation route; an information reading module, configured to read lane information at the change position of the lane; and a navigation module, configured to obtain a lane-level navigation route based on the road-level navigation route and the lane information at the change position of the lane.

According to yet another aspect, some embodiments of the present disclosure provide an electronic device, including: at least one processor; and a memory communicatively connected to the at least one processor. The memory stores instructions executable by the at least one processor, and the instructions, when executed by the at least one processor, cause the at least one processor to perform the method for constructing a lane-level navigation map and the method for lane-level navigation.

According to yet another aspect, some embodiments of the present disclosure provide a non-transitory computer readable storage medium storing computer instructions. The computer instructions are used to cause the computer to perform the method for constructing a lane-level navigation map and the method for lane-level navigation.

It should be understood that contents described in this section are neither intended to identify key or important features of embodiments of the present disclosure, nor intended to limit the scope of the present disclosure. Other features of the present disclosure will become readily understood in conjunction with the following description.

BRIEF DESCRIPTION OF THE DRAWINGS

The accompanying drawings are used for better understanding of the present solution, and do not constitute a limitation to the present disclosure.

DETAILED DESCRIPTION OF CERTAIN EMBODIMENTS

Example embodiments of the present disclosure are described below with reference to the accompanying drawings, where various details of the embodiments of the present disclosure are included to facilitate understanding, and should be considered merely as examples. Therefore, those of ordinary skills in the art should realize that various changes and modifications can be made to the embodiments described here without departing from the scope and spirit of the present disclosure. Similarly, for clearness and conciseness, descriptions of well-known functions and structures are omitted in the following description.

Figure 1:
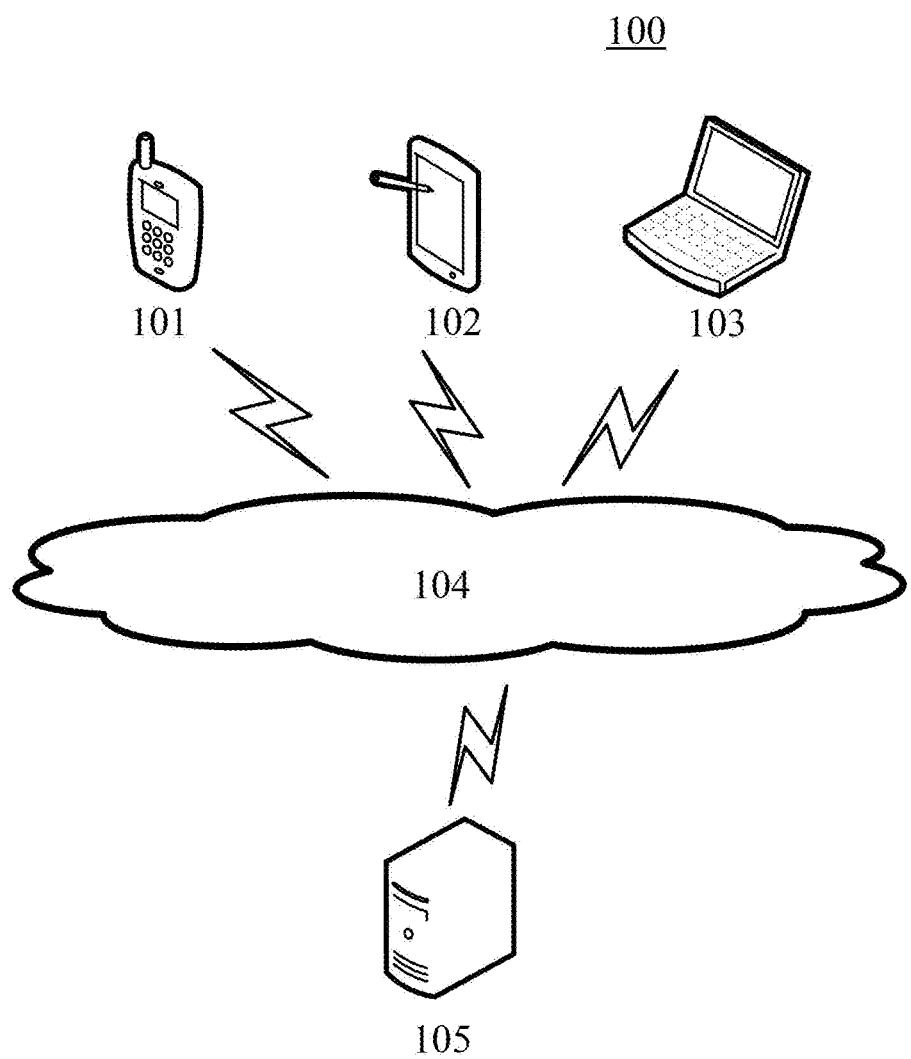
FIG. 1 is an exemplary system architecture diagram to which embodiments of the present disclosure may be applied.

FIG. 1 illustrates an exemplary system architecture 100 to which a method for constructing a lane-level navigation map or an apparatus for constructing a lane-level navigation map of embodiments of the present disclosure may be applied.

As shown in FIG. 1, the system architecture 100 may include terminal devices 101, 102, and 103, a network 104, and a server 105. The network 104 serves as a medium providing a communication link between the terminal devices 101, 102, 103, and the server 105. The network 104 may include various types of connections, such as wired or wireless communication links, or optical cables.

A user may use the terminal devices 101, 102, 103 to interact with the server 105 via the network 104 to acquire lane-level navigation and the like. Various client applications may be installed on the terminal devices 101, 102 and 103, such as map applications.

The terminal devices 101, 102, and 103 may be hardware or software. When the terminal devices 101, 102, and 103 are hardware, they may be various electronic devices, including but not limited to smart phones, tablet computers, laptop computers, desktop computers, and the like. When the terminal devices 101, 102, and 103 are software, they may be installed in the above electronic devices. The terminal devices 101, 102, and 103 may be implemented as a plurality of software or software modules, or may also be implemented as a single software or software module, which is not limited herein.

The server 105 may provide various map-based navigation services. For example, the server 105 may analyze and process a road-level navigation route acquired from the terminal devices 101, 102, and 103, and generate a processing result (e.g., a lane-level navigation route, etc.).

It should be noted that the server 105 may be hardware or software. When the server 105 is hardware, it may be implemented as a distributed server cluster composed of a plurality of servers, or may be implemented as a single server. When the server 105 is software, it may be implemented as a plurality of software or software modules (for example, for providing distributed services), or may also be implemented as a single software or software module, which is not limited herein.

It should be noted that the method for constructing a lane-level navigation map provided by embodiments of the present disclosure is generally performed by the server 105, accordingly, the apparatus for constructing a lane-level navigation map is generally provided in the server 105.

It should be understood that the numbers of terminal devices, networks, and servers in FIG. 1 are merely illustrative. Any number of terminal devices, networks, and servers may be provided according to implementation needs.

Figure 2:
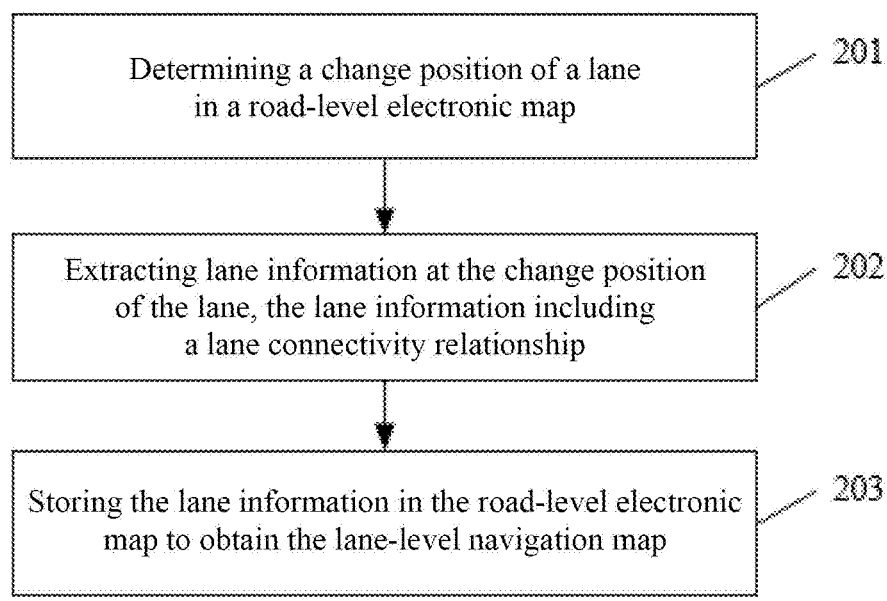
FIG. 2 is a flowchart of a method for constructing a lane-level navigation map according to an embodiment of the present disclosure.

It should be noted that a road-level electronic map mentioned in the embodiments of the present disclosure may be a conventional navigation map used by various mobile terminals, which only records road-level data without recording any lane-related information. A lane-level electronic map may be a high-accuracy navigation map, which contains abundant lane marking information. The lane marking information may be a lane marking style or the number of lanes, and thus the lane-level navigation can be implemented. With further reference to FIG. 2, which illustrates a flow 200 of a method for constructing a lane-level navigation map according to an embodiment of the present disclosure. The method for constructing a lane-level navigation map includes the following steps.

Step 201, determining a change position of a lane in a road-level electronic map.

In the present embodiment, an executing body (for example, the server 105 shown in FIG. 1) of the method for constructing a lane-level navigation map may determine the change position of a lane in the road-level electronic map. A characteristic of the road-level electronic map is that a road in the real world is abstracted into a vector line, and attribute information (such as a shape, a direction of the road or the like) are recorded based on the vector line. The road-level electronic map only records road-level data, but not the lane attribute information. Lanes, also known as racing lanes or roadways, are lanes with a certain width that are separated by lane markings on a road surface and available for vehicles to travel. The change position refers to a position where the lane markings on the road surface change, which may be a position where the marking style of the lane markings changes, or a position where a marking direction of the lane markings changes. Specifically, the executing body detects the lane markings on the road, and if the position where the lane markings change is detected, the position is recorded.

Step 202, extracting lane information at the change position of the lane, the lane information including a lane connectivity relationship.

In the present embodiment, after recording the change position of a lane, the executing body may further extract the lane information at the current change position of the lane. The lane information may be the lane marking style or the number of lanes. The lane information includes the lane connectivity relationship, and the lane connectivity relationship may be a travelable direction of the lanes or an accessible relationship of adjacent lanes. For example, if a lane marking between two adjacent lanes changes from a dashed line to a solid line along the road direction, then a vehicle may change lanes on a dashed line road section, but cannot change lanes on a solid line road section.

Step 203, storing the lane information in the road-level electronic map to obtain the lane-level navigation map.

In the present embodiment, after obtaining the lane information of the change position of the lane, the executing body may store the lane information in the road-level electronic map to obtain the lane-level navigation map. The storage may adopt a splite storage approach, which is not limited in the embodiments of the present disclosure. The splite is an open source and embedded relational database, which supports SQL language. The splite is used to store a large amount of data, and can perform operations, such as use, update, maintain or the like, on the data. The lane information is stored in vector line data of the road-level electronic map. One change position of a lane may use one primary key ID, and one ID of the change position of the lane may correspond to multiple pieces of pre-change information and post-change information. In the lane-level navigation map, a road in the real world is represented by a vector line. In addition to recording the attribute information (such as the shape, the direction or the like) of the road, the vector line also records the change position of a lane on the road and the lane information at the change position of the lane.

The method for constructing a lane-level navigation map provided by embodiments of the present disclosure, first determining the change position of a lane in the road-level electronic map; then extracting the lane information of the change position of a lane, the lane information including the lane connectivity relationship; and storing the lane information in the road-level electronic map to obtain the lane-level navigation map. The lane-level navigation map obtained in this way has a small volume of data and high usage efficiency, and can implement lane-level navigation, thereby improving navigation accuracy.

Figure 3:
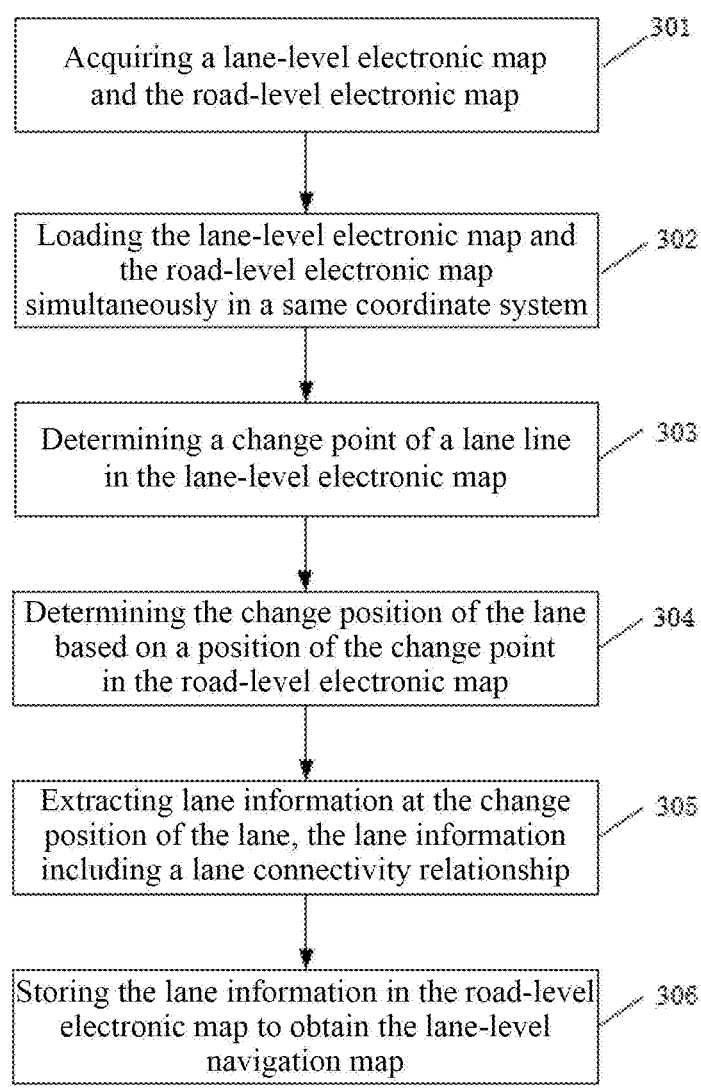
FIG. 3 is a flowchart of the method for constructing a lane-level navigation map according to another embodiment of the present disclosure.

With further reference to FIG. 3, illustrating a flow 300 of the method for constructing a lane-level navigation map according to another embodiment of the present disclosure. The method for constructing a lane-level navigation map includes the following steps.

Step 301, acquiring a lane-level electronic map and the road-level electronic map.

In the present embodiment, the executing body may acquire the lane-level electronic map and the road-level electronic map. Both the lane-level electronic map and the road-level electronic map may be pre-contracted electronic navigation maps. For example, the road-level electronic map may be a conventional navigation map used by various mobile terminals, which only records road-level data without recording any lane-related information, and the lane-level electronic map may be a high-accuracy navigation map commonly used in the field of autonomous driving, which contains abundant vector information and realizes the recording of three-dimensional space stereo information of the road.

In some alternative implementations of the present embodiment, the acquiring a lane-level electronic map, includes: acquiring a three-dimensional navigation map; and removing height coordinate information from the three-dimensional navigation map to obtain the lane-level electronic map.

In the present embodiment, the executing body may first acquire the three-dimensional navigation map. The three-dimensional navigation map is a map for autonomous driving services, which can also provide lane-level navigation information in addition to providing road-level navigation information.

In the present embodiment, after acquiring the three-dimensional navigation map, the executing body may remove the height coordinate information from the three-dimensional navigation map to obtain the lane-level electronic map. For example, the three-dimensional navigation map expresses 3D stereo spatial information, such as a sign on the road. The three-dimensional navigation map may record a width and a height of the sign. The height coordinate information may be removed, and only the road plane information is retained, such as lane marking information on the road surface.

In the present embodiment, the executing body may acquire the road-level electronic map, which represents a road in the real world as a vector line, and the vector line records attribute information such as a shape, a direction of the road, or the like.

Step 302, loading the lane-level electronic map and the road-level electronic map simultaneously in a same coordinate system.

In the present embodiment, after acquiring the lane-level electronic map and the road-level electronic map, the executing body may load the lane-level electronic map and the road-level electronic map simultaneously under the condition of ensuring them in the same coordinate system, so that the lane-level electronic map and the road-level electronic map are superimposed together and displayed, and lane marking information of the lane-level electronic map and vector line information of the road-level electronic map may be seen at the same time. The same coordinate system defaults to the coordinate system formulated by the National Bureau of Surveying and Mapping of China (such as GCJ-02 coordinate system).

Step 303, determining a change point of a lane line in the lane-level electronic map.

In the present embodiment, after loading the lane-level electronic map and the road-level electronic map simultaneously, the executing body may determine the change point of the lane line based on the displayed lane-level electronic map. The change point of the lane line may be a position where a lane direction changes, such as at a turning intersection; or may also be a position where a style of the lane line changes, such as a position where the lane line changes from a solid line to a dashed line.

Step 304, determining the change position of the lane based on a position of the change point in the road-level electronic map.

In the present embodiment, after determining the change point of the lane line in the lane-level electronic map, the executing body may determine the position of the change point in the road-level electronic map, based on the road-level electronic map displayed superimposed with the lane-level electronic map, thereby obtaining the change position of a lane in the road-level electronic map.

In some alternative implementations of the present embodiment, the determining the change position of a lane may be: making a vertical line perpendicular to the road surface at the change point, and using an intersection r of the vertical line and the road vector line in the road-level electronic map as the change position of the lane.

Step 305, extracting lane information at the change position of the lane, the lane information including a lane connectivity relationship.

Step 306, storing the lane information in the road-level electronic map to obtain the lane-level navigation map.

In the present embodiment, specific operations of steps 305-306 have been described in detail in steps 202-203 in the embodiment as shown in FIG. 2, and repeated description thereof will be omitted.

As can be seen from FIG. 3, in the method for constructing a lane-level navigation map in the present embodiment, first acquiring the lane-level electronic map and the road-level electronic map; then loading the lane-level electronic map and the road-level electronic map simultaneously in the same coordinate system; determining the change point of the lane line in the lane-level electronic map; determining the change position of a lane based on the position of the change point in the road-level electronic map; extracting the lane information at the change position of the lane, the lane information including the lane connectivity relationship; and storing the lane information in the road-level electronic map to obtain the lane-level navigation map. Compared with the embodiment corresponding to FIG. 2, an accuracy of the lane-level navigation map is further improved.

Figure 4:
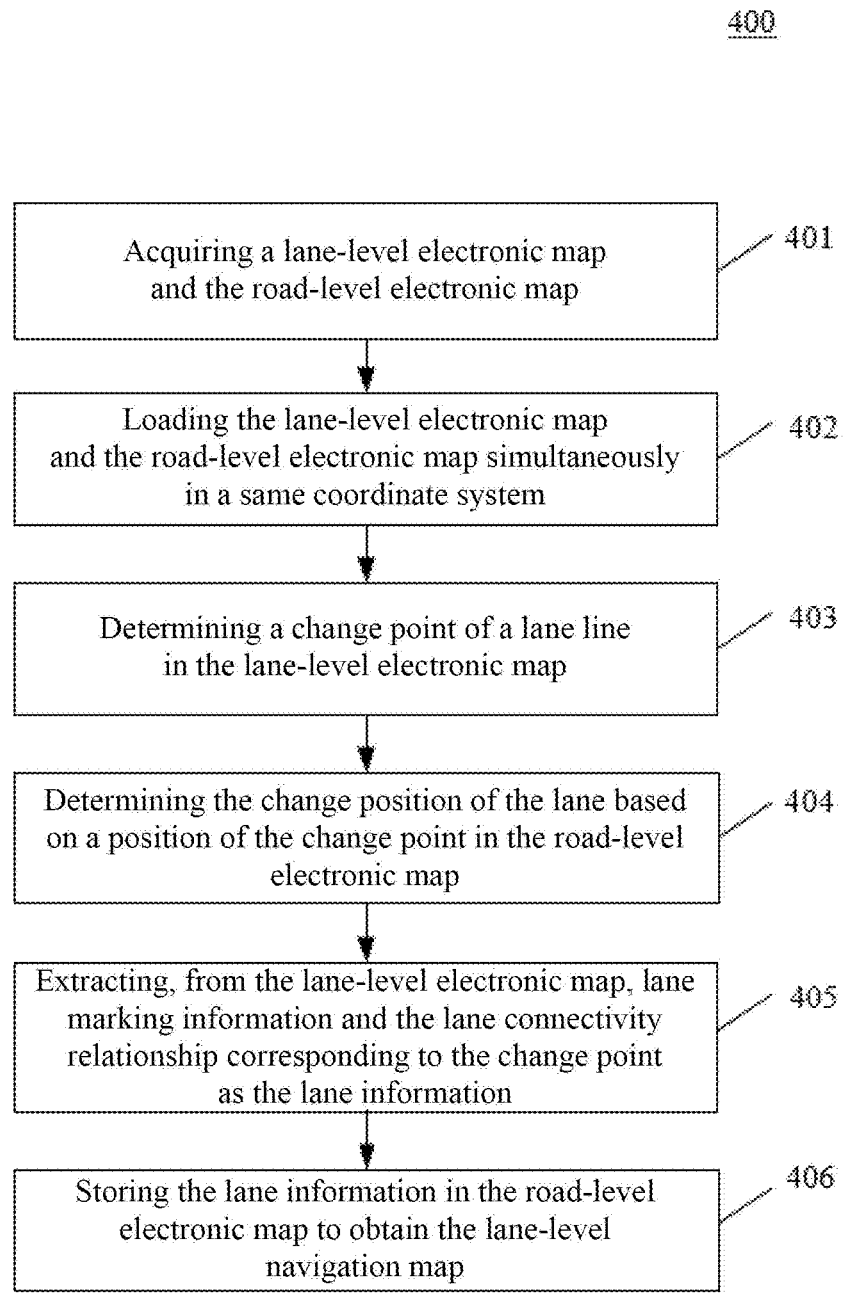
FIG. 4 is a flowchart of the method for constructing a lane-level navigation map according to yet another embodiment of the present disclosure.

With further reference to FIG. 4, illustrating a flow 400 of the method for constructing a lane-level navigation map according to yet another embodiment of the present disclosure. The method for constructing a lane-level navigation map includes the following steps.

Step 401, acquiring a lane-level electronic map and the road-level electronic map.

Step 402, loading the lane-level electronic map and the road-level electronic map simultaneously in a same coordinate system.

Step 403, determining a change point of a lane line in the lane-level electronic map.

Step 404, determining the change position of a lane based on a position of the change point in the road-level electronic map.

In the present embodiment, specific operations of steps 401-404 have been described in detail in steps 301-304 in the embodiment as shown in FIG. 3, and repeated description thereof will be omitted.

Step 405, extracting, from the lane-level electronic map, lane marking information and a lane connectivity relationship corresponding to the change point as the lane information.

In the present embodiment, after determining the change position of a lane, the executing body may extract, from the lane-level electronic map, the lane marking information and the lane connectivity relationship corresponding to the change point as the lane information. The lane-level electronic map records all lane markings on the road surface. The lane marking information corresponding to the change point may be the number of lanes at the change point; or may also be the lane marking style at the change point, such as solid line and dashed line. The lane connectivity relationship may be a travelable direction of the lanes or an accessible relationship of adjacent lanes.

In some alternative implementations of the present embodiment, the change position of a lane includes at least one of: original coordinates of the change position of the lane, projected coordinates of the change position of the lane, or a relative position of the change position of the lane. Since a road in the road-level electronic map is represented by a vector line, an actual position of a lane marking in reality and a position of the lane marking on the vector line may be inconsistent. The original coordinates of the change position of the lane represent the actual position of the lane marking in reality, and the projected coordinates of the change position of the lane represent the position of the lane marking on the vector line. The change position of the lane may occur in the middle of the road or at an intersection, so the relative position of the change position of the lane indicates that the change position of the lane is in the middle of the road or at the intersection. In the middle of the road, the original coordinates of the change position of the lane are consistent with the projected coordinates of the change position of the lane, while at the intersection, the original coordinates of the change position of the lane are inconsistent with the projected coordinates of the change position of the lane. In this regard, a steering should be prompted based on the projected coordinates of the change position of the lane, thereby improving the navigation accuracy.

Step 406, storing the lane information in the road-level electronic map to obtain the lane-level navigation map.

In the present embodiment, a specific operation of step 406 has been described in detail in step 203 of the embodiment as shown in FIG. 2, and repeated description thereof will be omitted.

As can be seen from FIG. 4, in the method for constructing a lane-level navigation map in the present embodiment, first determining the change position of a lane; then, from the lane-level electronic map, extracting the lane marking information and the lane connectivity relationship corresponding to the change point as the lane information; and finally, storing the lane information in the road-level electronic map to obtain the lane-level navigation map. Compared with the embodiment corresponding to FIG. 3, the navigation accuracy is further improved.

Figure 5:
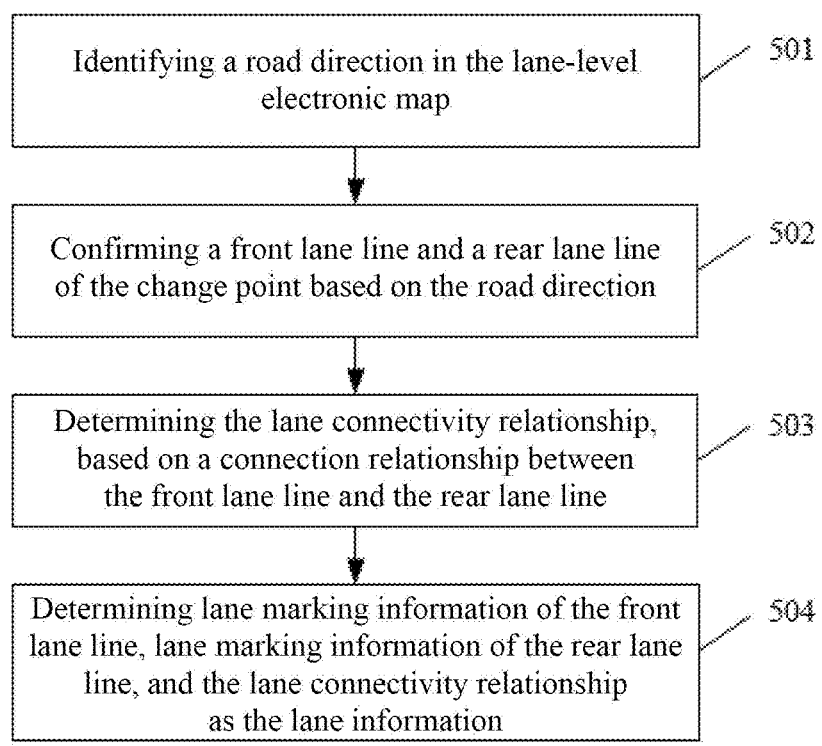
FIG. 5 is a flowchart of extracting lane marking information and a lane connectivity relationship corresponding to a change point as lane information from a lane-level electronic map according to an embodiment of the present disclosure.

With further reference to FIG. 5, illustrating a flow 500 of extracting lane marking information and a lane connectivity relationship corresponding to a change point from a lane-level electronic map as lane information according to an embodiment of the present disclosure. The method for extracting lane marking information and a lane connectivity relationship corresponding to a change point includes the following steps.

Step 501, identifying a road direction in the lane-level electronic map.

In the present embodiment, after determining the change position of a lane, the executing body may identify the road direction in the lane-level electronic map. The road direction may be judged based on ground arrows in the lane-level electronic map, or the road direction may be judged based on a direction of the road vector line in the road-level electronic map displayed superimposed with the lane-level electronic map.

Step 502, confirming a front lane line and a rear lane line of the change point based on the road direction.

In the present embodiment, after identifying the road direction in the lane-level electronic map, the executing body may confirm the front lane line and the rear lane line of the change point based on the road direction. For example, moving forward along the road direction, a lane line before passing the change point is the front lane line, and a lane line after passing the change point is the rear lane line.

Step 503, determining the lane connectivity relationship, based on a connection relationship between the front lane line and the rear lane line.

Figure 6:
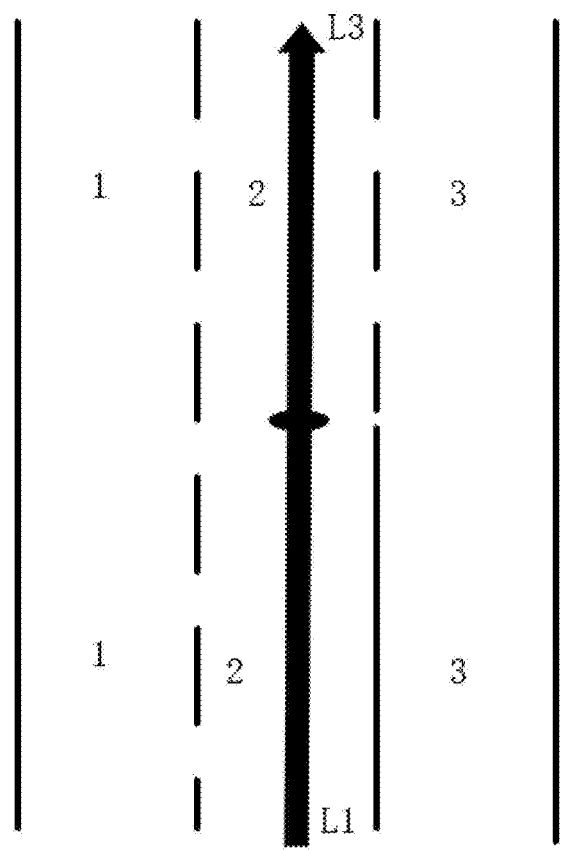
FIG. 6 is a schematic diagram of a lane connectivity relationship with direct front-to-rear connectivity.
Figure 7:
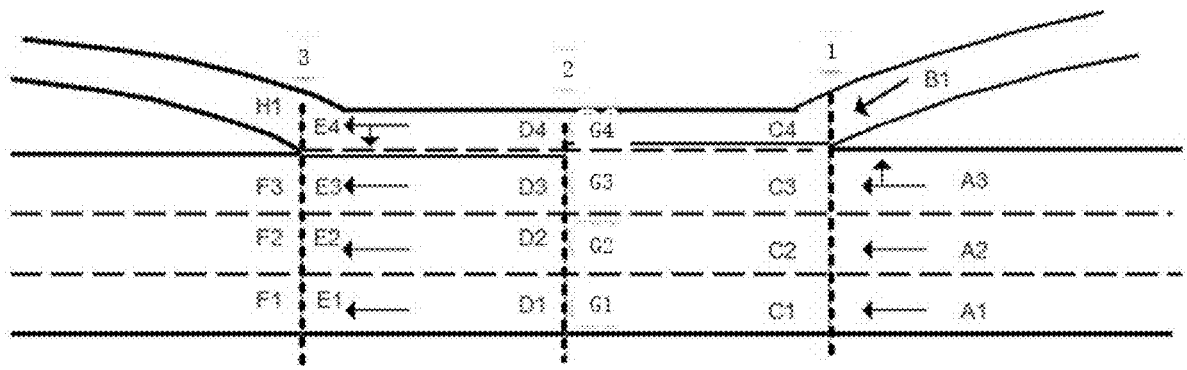
FIG. 7 is a schematic diagram of a lane connectivity relationship at a turning intersection.

In the present embodiment, after confirming the front lane line and the rear lane line of the change point, the executing body may determine the lane connectivity relationship, based on the connection relationship between a lane center line of the front lane line and a lane center line of the rear lane line. For example, as shown in FIG. 6, which shows a schematic diagram of a lane connectivity relationship with direct front-to-rear connectivity, in which a lane line between lane 2 and lane 3 changes from a solid line to a dashed line along the road direction. The front lane line and the rear lane line are continuously connected, but the style of the lane line is different. In this regard, the lane is connected with direct front-to-rear connectivity, and a vehicle may change lane lines at the rear lane line. As shown in FIG. 7, which shows a schematic diagram of a lane connectivity relationship at a turning intersection. There are three change positions of the lane in this road section. Dashed lines perpendicular to the road surface represent the change positions of the lane. At the first change position of the lane, the lane connectivity relationship is: a vehicle may travel from A1 to C1, from A2 to C2, from A3 to C3, and may change lanes at the dashed lines, may travel from A3 to C4, from B1 to C4, but cannot travel from B1 to C3, and the vehicle may travel from G4 to D3 at the second change position of the lane.

Step 504, determining lane marking information of the front lane line, lane marking information of the rear lane line, and the lane connectivity relationship as the lane information.

In the present embodiment, the lane information includes the lane marking information of the front lane line, the lane marking information of the rear lane line, and the lane connectivity relationship. The lane marking information may be at least one of: a position of a lane marking, a road direction of the change position of the lane, a marking style of the front lane line, a marking style of the rear lane line, the number of lanes of the front lane line, or the number of lanes of the rear lane line. The lane connectivity relationship may be an entry lane number, an exit lane number, or a lane connectivity type.

As can be seen from FIG. 5, the present embodiment first identifies the road direction in the lane-level electronic map; then, based on the road direction, confirms the front lane line and the rear lane line of the change point; determines the lane connectivity relationship, based on the connection relationship between the front lane line and the rear lane line; and determines the lane marking information of the front lane line, the lane marking information of the rear lane line, and the lane connectivity relationship as the lane information. Compared with the embodiment corresponding to FIG. 4, the navigation accuracy is further improved.

Figure 8:
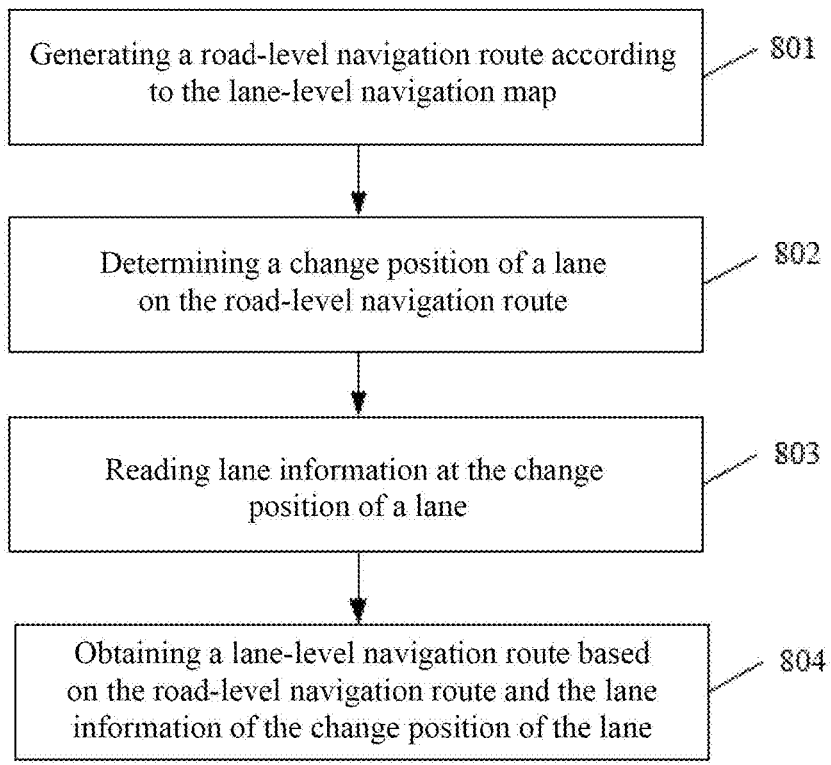
FIG. 8 is a flowchart of a method for lane-level navigation according to an embodiment of the present disclosure.

With further reference to FIG. 8, illustrating a flow 800 of a method for lane-level navigation according to an embodiment of the present disclosure. The method for lane-level navigation includes the following steps.

Step 801, generating a road-level navigation route based on the lane-level navigation map.

In the present embodiment, the lane-level navigation map may be obtained according to the construction method as shown in FIG. 2 to FIG. 4. After receiving a user's navigation request, the executing body may read the user's starting location and destination location from a road-level electronic map, and generate the road-level navigation route according to a navigation algorithm of the road-level electronic map.

Step 802, determining a change position of a lane on the road-level navigation route.

In the present embodiment, after generating the road-level navigation route, the executing body may determine the change position of a lane on the road-level navigation route based on the stored lane information.

Step 803, reading lane information at the change position of the lane.

In the present embodiment, after determining the change position of a lane on the road-level navigation route, the executing body may read the lane information of the change position of the lane. The lane information may be at least one of: a road direction of the change position of the lane, a marking style of the front lane line, a marking style of the rear lane line, the number of lanes of the front lane line, the number of lanes of the rear lane line, an entry lane number, an exit lane number, or a lane connectivity type.

Step 804, obtaining a lane-level navigation route based on the road-level navigation route and the lane information at the change position of the lane.

Figure 9:
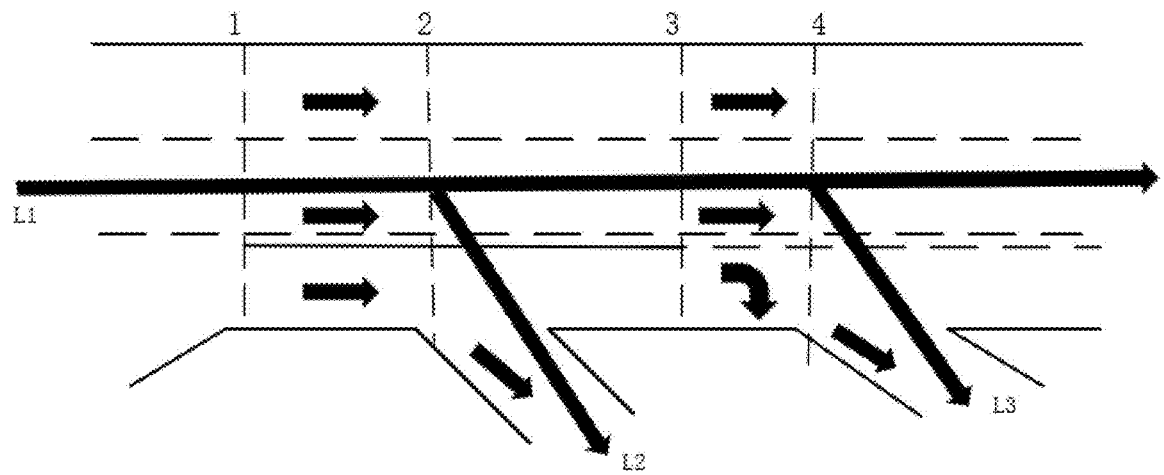
FIG. 9 is a schematic diagram of a lane-level navigation route.

In the present embodiment, the executing body may obtain the lane-level navigation route based on the road-level navigation route and the lane information at the change position of the lane. For example, as shown in FIG. 9, which shows a schematic diagram of a lane-level navigation route, black arrows represent road lines in the road-level electronic map, and dashed lines represent change positions of a lane. Supposing the road-level navigation route of a user to enter from an L1 road section, exit from an L3 road section, and travel in the middle lane when entering from the L1 road section. There are four change positions of the lane on this road-level navigation route, and it can be seen based on the lane information of the change positions of the lane, a vehicle may change lanes and travel to the rightmost lane before reaching the third change position of the lane, and travel to the rightmost lane without changing lanes after reaching the third change position of the lane. If only in the road-level electronic map, the user is only prompted to turn right to enter the L3 road section at the fourth change position of the lane, and if traveling in the middle lane at this time, the vehicle cannot enter the rightmost lane from the solid line, and the user can not enter the L3 road section. In the lane-level navigation map, the user may be prompted to change lanes before reaching the third change position of the lane, so that the user can change lanes in time and smoothly enter the L3 road section.

As can be seen from FIG. 8, the method for acquiring a lane-level navigation route in the present embodiment may provide the lane-level navigation route according to the connectable lane relationship, thereby improving the navigation accuracy.

Figure 10:
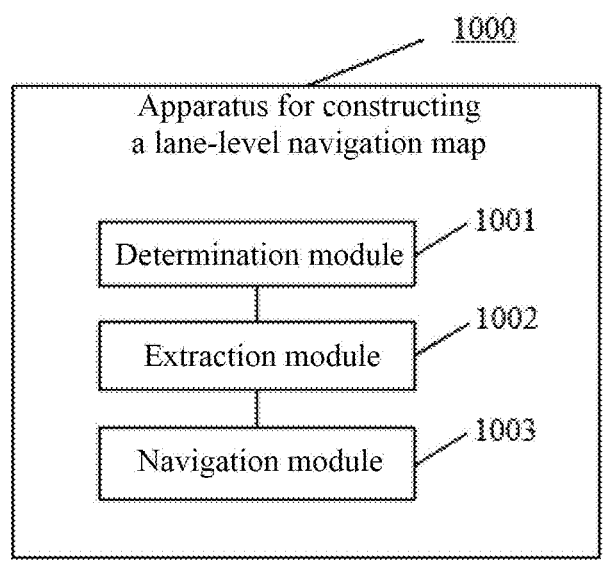
FIG. 10 is a schematic structural diagram of an apparatus for constructing a lane-level navigation map according to an embodiment of the present disclosure.

With further reference to FIG. 10, as an implementation of the method for constructing a lane-level navigation map shown in the above figures, an embodiment of the present disclosure provides an apparatus for constructing a lane-level navigation map, which corresponds to the method embodiment shown in FIG. 2, and the apparatus may be applied to various electronic devices.

As shown in FIG. 10, an apparatus 1000 for constructing a lane-level navigation map in the present embodiment may include: a determination module 1001, an extraction module 1002 and a navigation module 1003. The determination module 1001 is configured to determine a change position of a lane in a road-level electronic map. The extraction module 1002 is configured to extract lane information of the change position of the lane, the lane information including a lane connectivity relationship. The navigation module 1003 is configured to store the lane information in the road-level electronic map to obtain the lane-level navigation map.

In the present embodiment, in the apparatus 1000 for constructing a lane-level navigation map: for the specific processing and the technical effects of the determination module 1001, the extraction module 1002 and the navigation module 1003, reference may be made to the relevant descriptions of the steps 201-203 in the corresponding embodiment of FIG. 2 respectively, and repeated description thereof will be omitted.

In some alternative implementations of the present embodiment, the determination module 1001 includes: an electronic map acquiring submodule, configured to acquire a lane-level electronic map and the road-level electronic map; an electronic map loading submodule, configured to load the lane-level electronic map and the road-level electronic map simultaneously in a same coordinate system; a change point determining submodule, configured to determine a change point of a lane line in the lane-level electronic map; and a lane change position determining submodule, configured to determine the change position of a lane based on a position of the change point in the road-level electronic map.

In some alternative implementations of the present embodiment, the electronic map acquiring submodule includes: an acquiring unit, configured to acquire a three-dimensional navigation map; and a dimensionality reduction unit, configured to remove height coordinate information from the three-dimensional navigation map to obtain the lane-level electronic map.

In some alternative implementations of the present embodiment, the extraction module 1002 includes: a lane information extraction submodule, configured to extract, from the lane-level electronic map, lane marking information and a lane connectivity relationship corresponding to the change point as the lane information.

In some alternative implementations of the present embodiment, the lane information extraction submodule includes: a road direction identifying unit, configured to identify a road direction in the lane-level electronic map; a lane line confirming unit, configured to confirm a front lane line and a rear lane line of the change point based on the road direction; a lane connectivity relationship determining unit, configured to determine the lane connectivity relationship, based on a connection relationship between a lane center line of the front lane line and a lane center line of the rear lane line; and a lane information determining unit, configured to determine lane marking information of the front lane line, lane marking information of the rear lane line, and the lane connectivity relationship as the lane information.

In some alternative implementations of the present embodiment, the lane marking information in the lane information extraction submodule includes at least one of: a position of a lane marking, a road direction of the change position of a lane, a marking style of the front lane line, a marking style of the rear lane line, the number of lanes of the front lane line, or the number of lanes of the rear lane line; and the lane connectivity relationship in the lane information extraction submodule includes at least one of: an entry lane number, an exit lane number, or a lane connectivity type.

In some alternative implementations of the present embodiment, the change position of a lane includes at least one of: original coordinates of the change position of the lane, projected coordinates of the change position of the lane, or a relative position of the change position of the lane.

Figure 11:
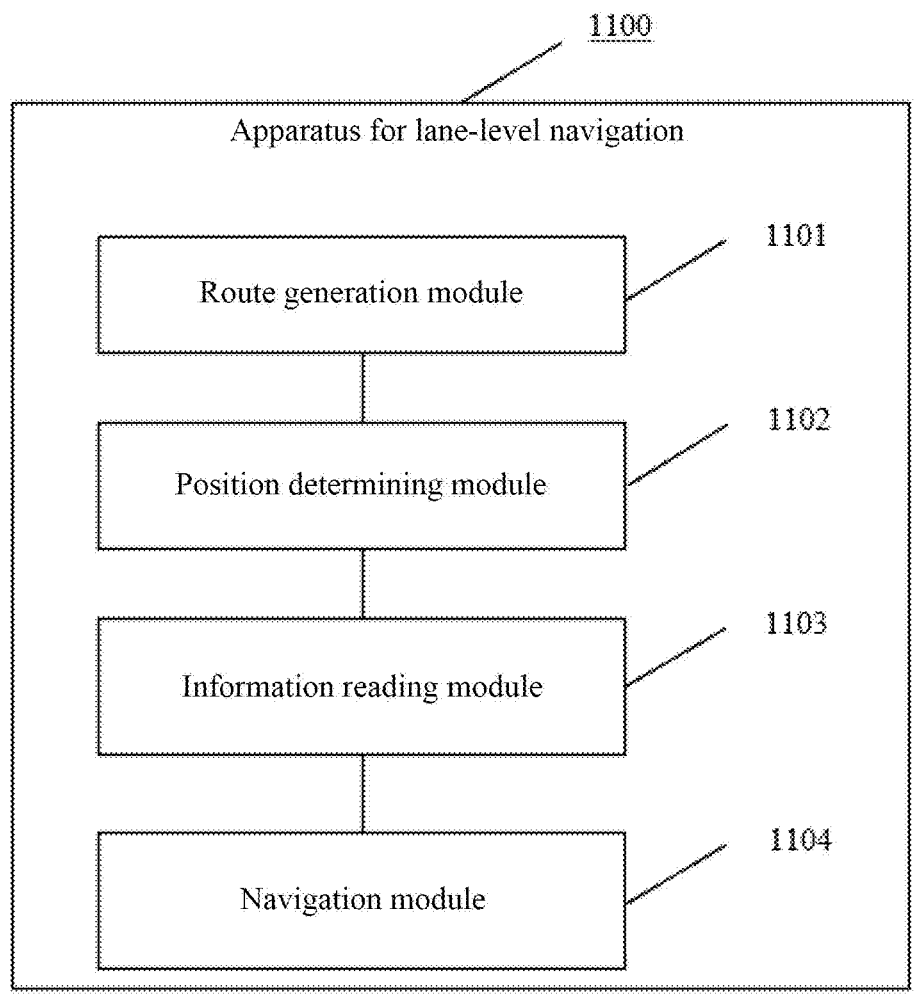
FIG. 11 is a schematic structural diagram of an apparatus for lane-level navigation according to an embodiment of the present disclosure.

With further reference to FIG. 11, as an implementation of the above method for lane-level navigation, an embodiment of the present disclosure provides an apparatus for lane-level navigation, which corresponds to the method embodiment shown in FIG. 8, and the apparatus may be applied to various electronic devices.

As shown in FIG. 11, an apparatus 1100 for lane-level navigation in the present embodiment may include: a route generation module 1101, a position determining module 1102, an information reading module 1103 and a navigation module 1104. The route generation module 1101 is configured to generate a road-level navigation route based on the lane-level navigation map. The position determining module 1102 is configured to determine a change position of a lane on the road-level navigation route. The information reading module 1103 is configured to read lane information at the change position of the lane. The navigation module 1104 is configured to obtain a lane-level navigation route based on the road-level navigation route and the lane information at the change position of the lane.

In the present embodiment, in the apparatus 1100 for lane-level navigation: for the technical effects of the lane-level navigation map, the change position of the lane, and the lane information at the change position of the lane, reference may be made to the relevant descriptions of steps 201-203 in the corresponding embodiment of FIG. 2 respectively, and repeated description thereof will be omitted.

According to an embodiment of the present disclosure, the present disclosure also provides an electronic device, a readable storage medium, and a computer program product.

Figure 12:
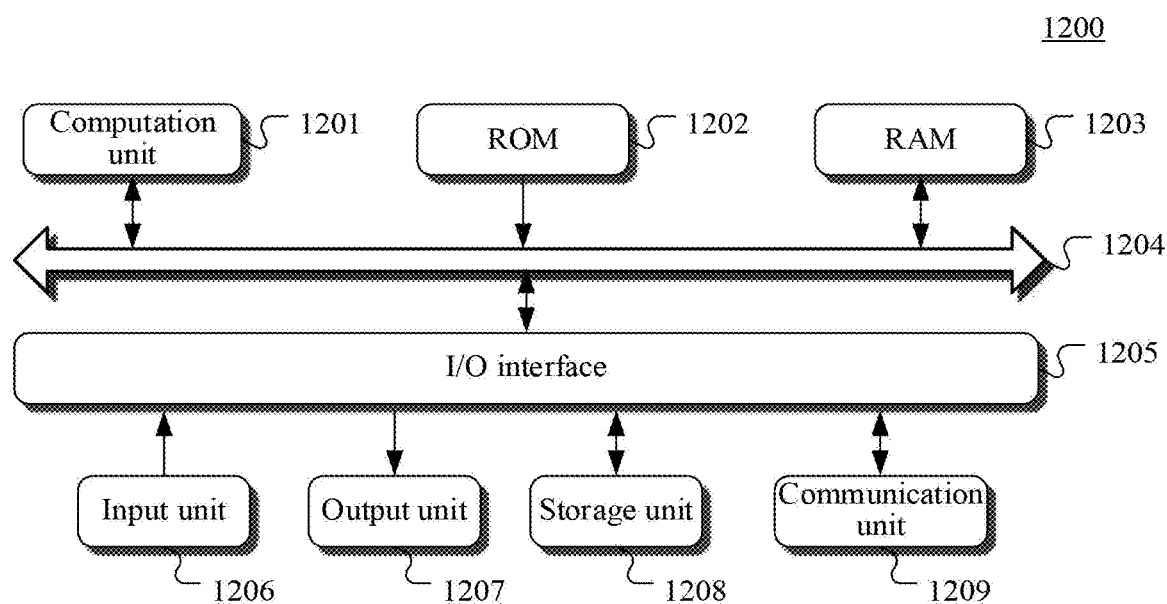
FIG. 12 is a block diagram of an electronic device used to implement the method for constructing a lane-level navigation map or the method for lane-level navigation according to embodiments of the present disclosure.

FIG. 12 illustrates a schematic block diagram of an example electronic device 1200 that may be used to implement embodiments of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The parts shown herein, their connections and relationships, and their functions are merely examples, and are not intended to limit the implementation of the present disclosure described and/or claimed herein.

As shown in FIG. 12, the device 1200 includes a computation unit 1201, which may perform various appropriate actions and processing, based on a computer program stored in a read-only memory (ROM) 1202 or a computer program loaded from a storage unit 1208 into a random access memory (RAM) 1203. In the RAM 1203, various programs and data required for the operation of the device 1200 may also be stored. The computation unit 1201, the ROM 1202, and the RAM 1203 are connected to each other through a bus 1204. An input/output (I/O) interface 1205 is also connected to the bus 1204.

A plurality of parts in the device 1200 are connected to the I/O interface 1205, including: an input unit 1206, for example, a keyboard and a mouse; an output unit 1207, for example, various types of displays and speakers; the storage unit 1208, for example, a disk and an optical disk; and a communication unit 1209, for example, a network card, a modem, or a wireless communication transceiver. The communication unit 1209 allows the device 1200 to exchange information/data with other devices over a computer network such as the Internet and/or various telecommunication networks.

The computation unit 1201 may be various general-purpose and/or dedicated processing components having processing and computing capabilities. Some examples of the computation unit 1201 include, but are not limited to, central processing unit (CPU), graphics processing unit (GPU), various dedicated artificial intelligence (AI) computing chips, various computation units running machine learning model algorithms, digital signal processors (DSP), and any appropriate processors, controllers, microcontrollers, etc. The computation unit 1201 performs the various methods and processes described above, such as a method for constructing a lane-level navigation map or a method for lane-level navigation. For example, in some embodiments, the method for constructing a lane-level navigation map may be implemented as a computer software program, which is tangibly included in a machine readable medium, such as the storage unit 1208. In some embodiments, part or all of the computer program may be loaded and/or installed on the device 1200 via the ROM 1202 and/or the communication unit 1209. When the computer program is loaded into the RAM 1203 and executed by the computation unit 1201, one or more steps of the method for constructing a lane-level navigation map or the method for lane-level navigation described above may be performed. Alternatively, in other embodiments, the computation unit 1201 may be configured to perform the method for constructing a lane-level navigation map or the method for lane-level navigation by any other appropriate means (for example, by means of firmware).

Various implementations of the systems and technologies described above herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), computer hardware, firmware, software, and/or a combination thereof. The various implementations may include: an implementation in one or more computer programs that are executable and/or interpretable on a programmable system including at least one programmable processor, which may be a special-purpose or general-purpose programmable processor, and may receive data and instructions from, and transmit data and instructions to, a storage system, at least one input apparatus, and at least one output device.

Program codes for implementing the method of the present disclosure may be compiled using any combination of one or more programming languages. The program codes may be provided to a processor or controller of a general-purpose computer, a special-purpose computer, or other programmable apparatuses for processing vehicle-road collaboration information, such that the program codes, when executed by the processor or controller, cause the functions/operations specified in the flow charts and/or block diagrams to be implemented. The program codes may be completely executed on a machine, partially executed on a machine, executed as a separate software package on a machine and partially executed on a remote machine, or completely executed on a remote machine or server.

In the context of the present disclosure, the machine-readable medium may be a tangible medium which may contain or store a program for use by, or used in combination with, an instruction execution system, apparatus or device. The machine-readable medium may be a machine-readable signal medium or a machine-readable storage medium. The machine-readable medium may include, but is not limited to, electronic, magnetic, optical, electromagnetic, infrared, or semiconductor systems, apparatuses, or devices, or any appropriate combination of the above. A more specific example of the machine-readable storage medium will include an electrical connection based on one or more pieces of wire, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, an optical storage device, a magnetic storage device, or any appropriate combination of the above.

To provide interaction with a user, the systems and technologies described herein may be implemented on a computer that is provided with: a display apparatus (e.g., a CRT (cathode ray tube) or a LCD (liquid crystal display) monitor) configured to display information to the user; and a keyboard and a pointing apparatus (e.g., a mouse or a trackball) by which the user can provide an input to the computer. Other kinds of apparatuses may also be configured to provide interaction with the user. For example, feedback provided to the user may be any form of sensory feedback (e.g., visual feedback, auditory feedback, or haptic feedback); and an input may be received from the user in any form (including an acoustic input, a voice input, or a tactile input).

The systems and technologies described herein may be implemented in a computing system (e.g., as a data server) that includes a back-end component, or a computing system (e.g., an application server) that includes a middleware component, or a computing system (e.g., a user computer with a graphical user interface or a web browser through which the user can interact with an implementation of the systems and technologies described herein) that includes a front-end component, or a computing system that includes any combination of such a back-end component, such a middleware component, or such a front-end component. The components of the system may be interconnected by digital data communication (e.g., a communication network) in any form or medium. Examples of the communication network include: a local area network (LAN), a wide area network (WAN), and the Internet.

The computer system may include a client and a server. The client and the server are generally remote from each other, and usually interact via a communication network. The relationship between the client and the server arises by virtue of computer programs that run on corresponding computers and have a client-server relationship with each other. The server may be a cloud server, a distributed system server, or a server combined with a blockchain. The server may also be a cloud server, or an intelligent cloud computing server or intelligent cloud host with artificial intelligence technology.

It should be understood that the various forms of processes shown above may be used to reorder, add, or delete steps. For example, the steps disclosed in the present disclosure may be executed in parallel, sequentially, or in different orders, as long as the desired results of the technical solutions disclosed in the present disclosure can be implemented. This is not limited herein.

The above specific implementations do not constitute any limitation to the scope of protection of the present disclosure. It should be understood by those skilled in the art that various modifications, combinations, sub-combinations, and replacements may be made according to the design requirements and other factors. Any modification, equivalent replacement, improvement, and the like made within the spirit and principle of the present disclosure should be encompassed within the scope of protection of the present disclosure.

What is claimed is:

1. A method for navigation, comprising:
generating a road-level navigation route based on a pre-constructed lane-level navigation map in response to receiving a navigation request from a user terminal;
determining a change position of a lane on the road-level navigation route based on lane information stored in the pre-constructed lane-level navigation map;
reading the lane information at the change position of the lane from the pre-constructed lane-level navigation map; and
obtaining a lane-level navigation route for navigation based on the road-level navigation route and the lane information at the change position of the lane;
wherein the pre-constructed lane-level navigation map is constructed by:
determining the change position of a lane in a road-level electronic map by:
acquiring a lane-level electronic map and the road-level electronic map, both the lane-level electronic map and the road-level electronic map being pre-contracted electronic navigation maps, and the lane-level electronic map comprising lane marking information; wherein acquiring the lane-level electronic map comprises acquiring a three-dimensional navigation map; and removing height coordinate information from the three-dimensional navigation map and retain road plane information to obtain the lane-level electronic map;

loading the lane-level electronic map and the road-level electronic map simultaneously in a same coordinate system such that the lane-level electronic map and the road-level electronic map are superimposed and displayed together;

determining a change point of a lane line in the displayed lane-level electronic map, wherein the change point is a position where a style of the lane line changes between a solid line and a dashed line; and determining the change position of the lane based on a position of the change point in the road-level electronic map;

extracting lane information at the change position of the lane, the lane information comprising a lane connectivity relationship; and storing the lane information in the road-level electronic map to obtain the pre-constructed lane-level navigation map.

2. The method according to claim 1, wherein the three-dimensional navigation map is a map for autonomous driving services; and removing height coordinate information from the three-dimensional navigation map and retain road plane information to obtain the lane-level electronic map comprises:

retaining the road plane information on a road surface, the road plane information comprising lane marking information.

3. The method according to claim 2, wherein extracting the lane information at the change position of a lane comprises:

extracting, from the lane-level electronic map, lane marking information and a lane connectivity relationship corresponding to the change point as the lane information.

4. The method according to claim 1, wherein extracting the lane information at the change position of the lane comprises:

extracting, from the lane-level electronic map, lane marking information and a lane connectivity relationship corresponding to the change point as the lane information.

5. The method according to claim 4, wherein extracting, from the lane-level electronic map, the lane marking information and the lane connectivity relationship corresponding to the change point as the lane information comprises:

identifying a road direction in the lane-level electronic map;

confirming a front lane line and a rear lane line of the change point based on the road direction;

determining the lane connectivity relationship, based on a connection relationship between a lane center line of the front lane line and a lane center line of the rear lane line; and determining lane marking information of the front lane line, lane marking information of the rear lane line, and the lane connectivity relationship as the lane information.

6. The method according to claim 5, wherein the lane marking information comprises at least one of:

a position of a lane marking, a road direction of the change position of the lane, a marking style of the front lane line, a marking style of the rear lane line, a number of lanes of the front lane line, or a number of lanes of the rear lane line, and wherein the lane connectivity relationship comprises at least one of:

an entry lane number, an exit lane number, or a lane connectivity type.

7. The method according to claim 1, wherein the change position of the lane comprises at least one of:

original coordinates of the change position of the lane, projected coordinates of the change position of the lane, or a relative position of the change position of the lane.

8. An electronic device, comprising:

at least one processor; and a memory communicatively connected to the at least one processor;

wherein the memory is configured to store a plurality of instructions executable by the at least one processor to cause the at least one processor to perform operations comprising:

generating a road-level navigation route based on a pre-constructed lane-level navigation map in response to receiving a navigation request from a user terminal;

determining a change position of a lane on the road-level navigation route based on lane information stored in the pre-constructed lane-level navigation map;

reading the lane information at the change position of the lane from the pre-constructed lane-level navigation map; and obtaining a lane-level navigation route based on the road-level navigation route and the lane information at the change position of the lane;

wherein the pre-constructed lane-level navigation map is constructed by:

determining the change position of a lane in a road-level electronic map by:

acquiring a lane-level electronic map and the road-level electronic map, both the lane-level electronic map and the road-level electronic map being pre-contracted electronic navigation maps, and the lane-level electronic map comprising lane marking information; wherein acquiring the lane-level electronic map comprises acquiring a three-dimensional navigation map; and removing height coordinate information from the three-dimensional navigation map and retain road plane information to obtain the lane-level electronic map;

loading the lane-level electronic map and the road-level electronic map simultaneously in a same coordinate system such that the lane-level electronic map and the road-level electronic map are superimposed and displayed together;

determining a change point of a lane line in the displayed lane-level electronic map, wherein the change point is a position where a style of the lane line changes between a solid line and a dashed line; and determining the change position of the lane based on a position of the change point in the road-level electronic map;

extracting lane information at the change position of the lane, the lane information comprising a lane connectivity relationship; and storing the lane information in the road-level electronic map to obtain the pre-constructed lane-level navigation map.

9. The electronic device according to claim 8, wherein the three-dimensional navigation map is a map for autonomous driving services; and removing height coordinate information from the three-dimensional navigation map and retain road plane information to obtain the lane-level electronic map comprises:

retaining the road plane information on a road surface, the road plane information comprising lane marking information.

10. The electronic device according to claim 8, wherein extracting the lane information at the change position of the lane comprises:

extracting, from the lane-level electronic map, lane marking information and a lane connectivity relationship corresponding to the change point as the lane information.

11. The electronic device according to claim 10, wherein extracting, from the lane-level electronic map, the lane marking information and the lane connectivity relationship corresponding to the change point as the lane information comprises:

identifying a road direction in the lane-level electronic map;

confirming a front lane line and a rear lane line of the change point based on the road direction;

determining the lane connectivity relationship, based on a connection relationship between a lane center line of the front lane line and a lane center line of the rear lane line; and determining lane marking information of the front lane line, lane marking information of the rear lane line, and the lane connectivity relationship as the lane information.

12. The electronic device according to claim 11, wherein the lane marking information comprises at least one of:
 a position of a lane marking,
 a road direction of the change position of the lane,
 a marking style of the front lane line,
 a marking style of the rear lane line,
 a number of lanes of the front lane line, or
 a number of lanes of the rear lane line, and
wherein the lane connectivity relationship comprises at least one of:
 an entry lane number, an exit lane number, or
 a lane connectivity type.

13. The electronic device according to claim 8, wherein the change position of the lane comprises at least one of:
 projected coordinates of the change position of the lane.

14. The electronic device according to claim 8, wherein the operations further comprise:
 determining the change position of the lane on the road-level navigation route;
 reading the lane information at the change position of the lane; and
 obtaining a lane-level navigation route based on the road-level navigation route and the lane information of the change position of the lane.

15. A non-transitory computer readable storage medium storing computer instructions, wherein the computer instructions are used to cause a computer to perform the method according to claim 1.

* * * * *